(12) United States Patent
Vilela et al.

(10) Patent No.: US 8,786,424 B2
(45) Date of Patent: Jul. 22, 2014

(54) ERROR SIGNAL HANDLING UNIT, DEVICE AND METHOD FOR OUTPUTTING AN ERROR CONDITION SIGNAL

(75) Inventors: Antonio Vilela, Mering (DE); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 205 days.

(21) Appl. No.: 13/397,035

(22) Filed: Feb. 15, 2012

(65) Prior Publication Data

US 2013/0207800 A1 Aug. 15, 2013

(51) Int. Cl.
*G08B 23/00* (2006.01)
(52) U.S. Cl.
USPC .......................................... 340/501; 701/31.4
(58) Field of Classification Search
USPC ............ 340/501; 370/215, 217; 701/31.4, 36, 701/29.1, 29.2, 97
See application file for complete search history.

(56) References Cited

U.S. PATENT DOCUMENTS

| 6,484,082 | B1 * | 11/2002 | Millsap et al. | 701/48 |
| 7,113,860 | B2 * | 9/2006 | Wang | 701/93 |
| 2002/0012325 | A1 * | 1/2002 | Kikkawa et al. | 370/311 |
| 2006/0276947 | A1 * | 12/2006 | Kaita et al. | 701/48 |
| 2011/0046844 | A1 * | 2/2011 | Honner et al. | 701/33 |
| 2012/0106446 | A1 * | 5/2012 | Yousefi et al. | 370/328 |
| 2013/0201817 | A1 * | 8/2013 | Jiang et al. | 370/217 |

OTHER PUBLICATIONS

U.S. Appl. No. 13/662,846, filed Oct. 29, 2012. 41 Pages.

* cited by examiner

*Primary Examiner* — John A Tweel, Jr.
(74) *Attorney, Agent, or Firm* — Eschweiler & Associates, LLC

(57) ABSTRACT

An Error signal handling comprises a circuitry configured to receive an error signal from an external device indicating an error condition in the external device. The circuitry is further configured to receive a recovery signal indicating a mitigation of the error condition in the external device or indicating that a mitigation of the error condition in the external device is possible. Furthermore, the circuitry is further configured to output an error condition signal based on the error signal in response to a reception of the error signal if within a given delay time from the reception of the error signal, the circuitry does not receive the recovery signal and otherwise to omit outputting the error condition signal.

22 Claims, 6 Drawing Sheets

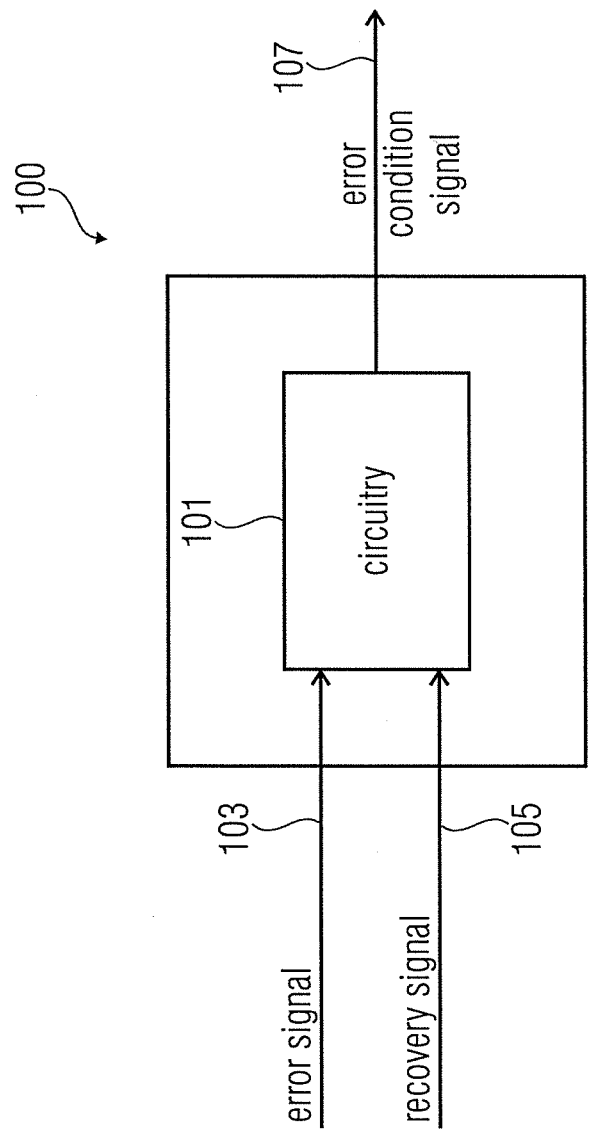

ERROR SIGNAL HANDLING UNIT, DEVICE AND METHOD FOR OUTPUTTING AN ERROR CONDITION SIGNAL

FIELD

Embodiments of the present invention relate to an error signal handling unit. Further embodiments of the present invention relate to a device configured to output in response to an error condition in the device an error signal. Further embodiments of the present invention relate to a method for outputting an error condition signal.

BACKGROUND

Modern automotive ECUs (ECU—Electrical Control Unit) will integrate more and more functionality. This trend is driven by the technology scaling on one side, enabling a high level of integration and by the highly cost driven nature of the automotive industry that forces to reduce the total number of ECUs per car. Electronics play an increasing role in providing advanced driving assistance functions and especially in preventing hazards that will reduce the number of fatal injuries.

The integration of functions inside an ECU is mainly concentrated around a multi-CPU microcontroller that plays a critical role by hosting the critical computation and control functions. Such microcontroller can be seen as a cluster of computation nodes with defined and encapsulated tasks. Under such assumptions failure isolation is a main concern to address, it influences all the building blocks of the safety architecture.

The key issue with the growing complexity of automotive ECU and with the focus on ISO26262 is that automotive ECUs shall be able to provide uninterrupted service, not only for minor error but also for errors classified as critical today.

SUMMARY

Embodiments of the present invention relate to an error signal handling unit comprising a circuitry configured to receive an error signal from an external device indicating an error condition in the external device. Furthermore, the circuitry is further configured to receive a recovery signal indicating a mitigation of the error condition in the external device or indicating that the mitigation of the error condition in the external device is possible. Furthermore, the circuitry is further configured to output an error condition signal based on the error signal in response to a reception of the error signal if within a given delay time from the reception of the error signal, this circuitry does not receive the recovery signal, and otherwise to omit outputting the error condition signal.

Further embodiments of the present invention relate to a device configured to output in response to an error condition in the device an error signal indicating an error condition and output, in response to a mitigation of the error condition or if a mitigation of the error condition is possible, a recovery signal indicating the mitigation or the possibility of mitigation of the error condition.

Further embodiments of the present invention relate to an error signal handling system comprising such device and such error signal handling unit.

BRIEF DESCRIPTION OF THE DRAWINGS

Embodiments of the present invention will be described using the accompanying figures, in which:

FIG. 1a shows a block schematic diagram of an error signal handling unit according to an embodiment of the present invention;

DETAILED DESCRIPTION

Figure 1B:
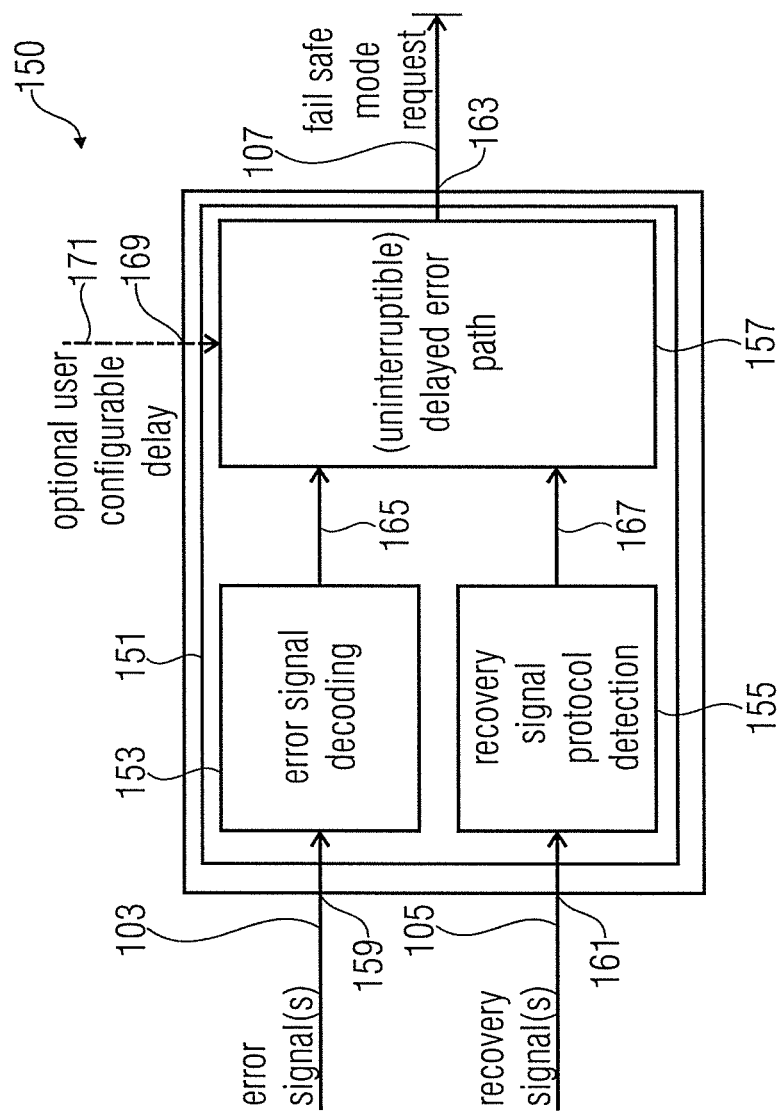
FIG. 1b shows a block schematic diagram of an error signal handling unit according to a further embodiment of the present invention.

Before embodiments of the present invention will be described in more detail using the accompanying figures, it is to be pointed out that the same or functionally equal elements are provided with the same reference numbers and that a repeated description of elements provided with the same reference numbers is omitted. Hence, descriptions provided for elements having the same reference numbers are mutually exchangeable.

FIG. 1a shows a block schematic diagram of an error signal handling unit 100 according to an embodiment of the present invention. The error signal handling unit 100 comprises a circuitry 101 that is configured to receive an error signal 103 from an external device (not shown in FIG. 1a), the error signal 103 indicating an error condition in the external device.

Furthermore, the circuitry 101 is configured to receive a recovery signal 105, the recovery signal 105 indicating a mitigation of the error condition in the external device or indicating that a mitigation of the error condition in the external device is possible.

Furthermore, the circuitry is further configured to output an error condition signal 107 based on the error signal 103 in response to a reception of the error signal 103 if within a given delay time from the reception of the error signal 103, the circuitry 101 does not receive the recovery signal 105 (from the external device) and otherwise to omit outputting the error condition signal 107.

In other words, the circuitry 101 is configured to receive the error signal 103 and to wait at least the given delay time until it provides the error condition signal 107, and provide the error condition signal 107 only if within the given delay time, no recovery signal 105 (indicating a mitigation of the error condition in the external device or indicating that a mitigation of the error condition is possible) is received.

It is a core idea of embodiments of the present invention that a system availability can be improved if errors or error conditions are safely managed as this is done by the error signal handling unit 100 in outputting the error condition signal 107 only if within the given delay time no recovery signal 105 is received. By this it can be achieved that a further external device (not shown in FIG. 1a) which may receive the error condition signal 107 does not immediately enter a fail safe mode upon the generation of the error signal 103, although the error condition based on which the external device generates the error condition 103 can be mitigated or is already mitigated. As an example the further external device may be an ECU and by having the error signal handling unit 100 between the ECU and the external device it can be safely avoided that the ECU enters a fail safe mode for critical errors, as long as these errors are mitigated in the allowed given delay time.

In contrast to this, typically automotive ECUs are built in a way that critical errors always lead to entering a fail safe mode, even when these errors can be mitigated in the device having such an error. In this case, an error recovery is only possible after such an ECU enters a fail safe mode which may even lead to the case that an ECU service is stopped. Especially when thinking about electronic steering of heavy vehicles such an ECU fail safe may raise concerns of a vehicle controllability.

Hence, embodiments of the present invention enable that an ECU does not immediately enter a fail safe mode upon generation of the error signal 103, as the error condition signal 107 is only output from the circuitry 101 if within the given delay time no recovery signal 105 is received. In other words, embodiments of the present invention allow the mitigation of an error condition in an external device, if this mitigation is possible and prevent an ECU from immediately entering a fail safe mode as the error condition can be mitigated or is already mitigated.

In other words, the external device posting a critical error (as the error signal 103) has the option to disable it using the recovery signal 105 transmitted to the circuitry 101.

As an example the circuitry 101 may be configured to forward the error signal 103 (for example as the error condition signal 107) if within the given delay time the circuitry 101 does not receive the recovery signal 105. Furthermore, the circuitry 101 may not forward the error signal 103 if within the given delay time from the reception of the error signal 103 it does not receive the recovery signal 105. In other words, the error condition signal 107 may not only comprise information that an error happened, but may also comprise information about the device that generated the error signal and also about the type of error happened in the external device.

According to further embodiments, an external device may generate the recovery signal only after a mitigation of the error condition in the external device. Hence, in some embodiments of the present invention the circuit 101 may be configured to receive the recovery signal 105 indicating a mitigation of the error condition in the external device or, in other words, indicating that the error condition reported within the error signal 103 is not apparent anymore.

FIG. 1b shows a block schematic diagram of an error signal handling unit 150 according to a further embodiment of the present invention. The error signal handling unit 150 differs from the error signal handling unit 100 shown in FIG. 1a in that the error signal handling unit 150 comprises a more complex circuitry 151, when compared to the circuitry 101 of FIG. 1a. This circuitry 151 may be a possible implementation of the circuitry 101 shown in FIG. 1a.

Further embodiments of the present invention may comprise some or all of the additional features of the circuitry 151, when compared to the circuitry 101.

The circuitry 151 comprises an error signal decoding stage 153, a recovery signal protocol detection stage 155 and an error condition signal generation stage 157.

According to further embodiments of the present invention, the error signal handling unit 150 may comprise a first terminal 159 for receiving the error signal 103 or a plurality of error signals 103, a second terminal 161 for receiving the recovery signal 105 or a plurality of recovery signals 105 and a third terminal 163 for outputting or providing the error condition signal 107 or a plurality of error condition signals 107.

In the example shown in FIG. 1b the error signal handling unit 150 is configured to receive the error signal 103 and the recovery signal 105 at the two different terminals 159, 161 (e.g. using a first communication protocol and/or communication line for the error signal 103 and using a second communication protocol and/or communication line for the recovery signal 105). Nevertheless, according to further embodiments of the present invention an error signal handling unit may also comprise one terminal for receiving the error signal 103 and the recovery signal 105 (e.g. using one and the same communication protocol and/or communication line for receiving the error signal 103 and the recovery signal 105).

As an example, in a very simple embodiment in which just one bit (which can be received at this one terminal for receiving the error signal 103 and the recovery signal 105) is used for signaling the error signal 103 and the recovery signal 105, the error signal 103 may correspond to a first state of this bit at this one terminal (e.g. a high state or low state), while the recovery signal 105 may correspond to a second state of this bit at this one terminal (e.g. a low state or high state) which is different than the first state. Under normal conditions this bit would have the second state, indicating that no error is present. If an error happens the external device would change the state of this bit from the second state to the first state which corresponds to the error signal 103. The circuitry 151 may be configured to, if this bit is not changed back to the second state (which corresponds to the recovery signal 105) within in the given delay time, output the error condition signal 107 and otherwise (if the bit is changed back to the second state within the given delay time) to omit outputting the error condition signal 107.

An advantage of using the two different terminals 159, 161 for the error signal 103 and the recovery signal 105 is that different communication protocols can be used for the error signal 103 and the recovery signal 105, such as a not so complex one, but robust one for the error signal 103 and the more complex one (but may be not so robust one) for the recovery signal 105. Thus, it can be enabled that especially error signals 103 can be reported in a robust and fast way from an external device to the error signal handling unit 150, while recovery signals 105 (which may not be as time critical as error signals 103) may use a more complex communication protocol, which enables the transmission of a larger amount of information. In other words, by using the two different terminals 159, 161 it can be achieved that even under worst conditions an error signal generated by an external device is received at the error signal handling unit 150 and may be forwarded as the error condition signal 107 to a further external device, while a corresponding recovery signal 105 may not find its way from the external device to the error signal handling unit 150 under these worst conditions. Hence, the worst thing that could happen is that the further external device enters a fail safe mode although the error condition in the external device is already mitigated. Nevertheless, this entering of the fail safe mode is still better than not entering at all a fail safe mode, e.g., when the error signal 103 does not find its way to the error signal handling unit 150 (e.g. when using a not so robust communication protocol).

As an example, the first terminal 103 may be one single bit line, wherein a first state of the bit line (e.g. a "high" state) indicates an error condition, while a second state of the bit line (e.g. a "low" state) indicates that no error condition is apparent in the external device. According to further embodiments, the second terminal 161 may be a so-called SPI terminal (SPI—Serial Peripheral Interface), e.g. having at least three communication lines or communication wires between the error signal handling unit 150 and the external device.

Hence, in one embodiment the communication protocols used for the error signal 103 and the recovery signal 105 may be different, and even the terminals 159, 161 for receiving the error signal 103 and the recovery signal 105 may be different from each other.

The error signal decoding stage 153 may be configured to decode the error signal 103 (received at the first terminal 159) and generate a decoded error signal 165. Furthermore, the error signal decoding stage 153 may be configured to provide the decoded error signal 165 to the error condition signal generation stage 157.

In an embodiment of the present invention, in which the error signal 103 is just a one-bit signal, the error signal decoding stage 153 may be configured to just forward this state of this one bit as the decoded error signal 165. In a more complex embodiment of the present invention, in which the error signal 103 is transmitted according to a more complex communication protocol (e.g. according to an SPI communication protocol, a CAN-communication protocol or a FlexRay-communication protocol) the error signal decoding stage 153 may be configured to decode the error signal 103 based on the communication protocol of the error signal 103.

The recovery signal protocol detection stage 155 may be configured to decode the recovery signal 105 according to a given communication protocol decoding rule (which may be different from a communication protocol decoding rule for decoding the error signal 103) to generate a decoded recovery signal 167. Especially in embodiments of the present invention, which are configured to receive multiple error signals 103 (e.g. each indicating a different error condition in the external device) it may be advantageous to receive different recovery signals 105 for the different error signals 103 each recovery signal 105 indicating a mitigation of a certain error condition in the external device. Hence, the decoded error signal 165 may define a specific error condition in the external device (e.g. out of a plurality of possible error conditions) and the decoded recovery signal 167 may define a mitigation of this specific error condition in the external device (e.g. out of a plurality of possible error conditions in the external device).

The error condition signal generation stage 157 may be configured to receive the decoded error signal 165 and the decoded recovery signal 167 and may be configured to generate the error condition signal 107 (for example as a fail safe mode request signal 107) based on the decoded error signal 165 and output the error condition signal 107 if within the given delay time, the error condition signal generation stage 157 does not receive the decoded recovery signal 167 (e.g. indicating a mitigation of the specific error condition indicated by the decoded error signal 165), and otherwise to omit outputting the error condition signal 107.

The error condition signal generation stage 157 may also be called an (uninterruptable) delayed error path as it delays the decoded error signal 165 (at maximum for the given delay time) before it outputs the error condition signal 107. In the case of the error signal handling unit 150 being capable of handling a plurality of error signals (e.g. for a plurality of different error conditions of the external device) the error condition signal generation stage 157 may be configured to omit outputting a first error condition signal 107 based on a first decoded error condition signal 165 (indicating a first error condition in the external device), if it receives within the given delay time from the reception of the first decoded error signal 165 a first decoded recovery signal 167 indicating a mitigation of this first error condition in the external device (and not of any other error condition in the external device) or indicating that a mitigation of this first error condition (and not any other error condition in the external device) is possible.

As already mentioned above, the error condition signal generation stage 157 may be configured to generate the error condition signal 107 as a fail safe mode request signal 107. Such a fail safe mode request signal 107 may be based on the error signal 103 and may indicate a request to the further external device (e.g. connected to the third terminal 163) to enter a fail safe mode. It is to be pointed out again that the entering of the fail safe mode can be prevented with the error signal handling unit 150 if the error condition based on which this fail safe mode request signal 107 may be generated is mitigated within the given delay time or if it is reported to the error signal handling unit 150 within the given delay time that this error condition can be mitigated.

Furthermore, as can be seen from FIG. 1b, the circuitry 151 (e.g. the error signal condition generation stage 157) may be configured such that the given delay time is configurable by a user. For this, the error signal handling unit 150 may comprise a fourth terminal 169 at which it receives a delay time adjust signal 171. The error condition signal generation stage 157 may be configured to adjust, upon reception of this delay time adjust signal 171 the given delay time.

According to further embodiments, it is also possible that the given delay time comprises a fixed part which is not adjustable by the user and an adjustable part, which is adjustable by the user. In other words, the circuitry 151 (e.g. the error condition signal generation stage 157) may be configured to wait before it outputs the error condition 107 at least the fixed part of the given delay time (independent of the delay time adjust signal 171) as this delay time adjust signal 171 is only used for adjusting the adjustable part of the given delay time.

In other words, the fixed part of the given delay time may define a minimum waiting time between a reception of the error signal 103 and the generation of the error condition signal 107, which can be extended based on the adjustable part of the given delay time by the user.

According to further embodiments, in which the error signal handling unit 150 is configured to handle different error signals 103 the circuitry 151 (e.g. the error condition generation stage 157) may have different delay times for different error signals 103. As an example, for not so critical error conditions in the external device the given delay times may be longer than for more critical error conditions in the external device.

As an example, the circuitry 151 may be configured to receive a first error signal indicating a first error condition in the external device and receive a first recovery signal indicating a mitigation of the first error condition or indicating that a mitigation of the first error condition in the external device is possible and the circuitry 151 may be configured to output a first error condition signal based on the first error signal in response to a reception of the first error signal if within a first given delay time from the reception of the first error signal the circuitry 151 does not receive the first recovery signal. Furthermore, the circuitry 151 may be configured to receive a second error signal indicating a second error condition in the external device (which may be different to the first error condition) and receive a second recovery signal indicating a mitigation of the second error condition or indicating that a mitigation of the second error condition in the external device is possible. The circuitry 151 may be further configured to output a second error condition signal based on the second error signal in response to a reception of the second error signal if within a second given delay time from the reception of the second error signal, the circuitry 151 does not receive the second recovery signal.

The first delay time and the second delay time may be different from each other. As an example, the first error condition may be a more critical error condition than the second error condition and therefore, the first given delay time may be shorter than the second given delay time.

According to further embodiments of the present invention, the circuitry 151 (e.g. the error condition generation stage 157) may be configured to generate the error condition signal 107 independent of the type of error signal 103 received (or in other words independent of the error condition in the external device). As an example, the circuitry 151 may generate the same error condition signal 107 for the first error signal and for the second error signal. As an example, the error condition signal 107 may use a very robust communication protocol (such as a one-bit line), wherein a high signal indicates a request for entering the fail safe mode and the low signal indicates that no error condition is present and hence, that no fail safe mode is needed. In other words, the circuitry 151 may be configured to generate the first error condition signal and the second error condition signal such that the first error condition signal is equal to the second error condition signal.

Of course, according to further embodiments of the present invention, it is also possible that the first error condition signal and the second error condition signal are different from each other, for example, the first error condition signal may comprise information about the first error condition and the second error condition signal may comprise information about the second error condition.

The circuit 151 may be designated also as an error signal delay stage 151 which is coupled between the first terminal 159, the second terminal 161 and the third terminal 163. The first terminal 159 may also be designated as the first input terminal, the second terminal 161 may also be designated as the second input terminal and the third terminal 163 may also be designated as output terminal.

The error signal delay stage 151 is configured to provide, in response to a reception of the error signal 103 (indicating the error condition in the external device) from the external device at the first input terminal 159 the error condition signal 107 based on the error signal 103 at the output terminal 107 if within the given delay time the error signal delay stage 151 does not receive the recovery signal 105 (indicating a mitigation of the error condition in the external device or indicating that a mitigation of the error condition in the external device is possible) from the external device at the second input terminal 161, and otherwise to omit outputting the error condition signal 107.

Figure 2:
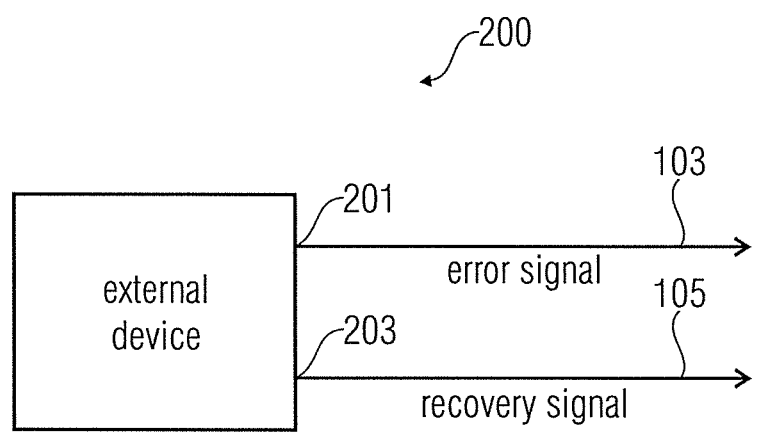
FIG. 2 shows a block schematic diagram of a device according to an embodiment of the present invention.

FIG. 2 shows a block schematic diagram of a device 200 according to an embodiment of the present invention. The device 200 may be, for example, an external device which is configured to get connected to the error signal handling unit 100 shown in FIG. 1a and/or to the error signal handling unit 150 shown in FIG. 1b.

As an example, the external device 200 may be a so-called MCU (MCU—Microcontroller), which generates upon a detection of an error condition in the device 200 an error signal 103 and which is further configured to generate a recovery signal 105 if the error condition in the device 200 is mitigated or if the error condition in the device 200 can be mitigated.

In other words, the device 200 is configured to output in response to an error condition in the device 200 the error signal 103 indicating the error condition and output in response to a mitigation of the error condition or if a mitigation of the error condition is possible, the recovery signal 105 indicating the mitigation or the possibility of mitigation of the error condition.

Hence, the device 200 may be configured to detect if an error condition is apparent in the device 200 and may upon a detection of such an error condition output the error signal 103. Furthermore, the device 200 may be configured to determine if an error condition in the device 200 can be mitigated or fixed and output the recovery signal 105 if the error condition is mitigated or fixed or if the device 200 detected that the error condition can be mitigated or fixed.

According to further embodiments of the present invention, the device 200 may comprise a first terminal 201 for providing the error signal 103 and a second terminal 203 for providing the recovery signal 105. As an example, the device 200 may be configured to output the error signal 103 (at the first terminal 201) according to a first communication protocol and the recovery signal 105 (at the second terminal 203) according to a second communication protocol, wherein the first communication protocol and the second communication protocol may be different.

As already mentioned in conjunction with the error signal handling unit 150 the first communication protocol for the error signal 103 may be a more robust one than the second communication protocol for the recovery signal 105, e.g. such that a loss of the error signal 103 even under worst case conditions is much more unlikely than a loss of the recovery signal 105.

As an example, the first terminal 201 may be compatible to the first terminal 159 of the error signal handling unit 150 and the second terminal 203 may be compatible to the second terminal 161 of the error signal handling unit 150. As an example, the first terminal 201 may be a single pin (e.g. if the error signal 103 is transmitted using just one signal line) while the second terminal 203 may be a more complex terminal (comprising a plurality of different pins or contacts), e.g., such as an SPI terminal, CAN terminal or FlexRay terminal.

According to further embodiments the first terminal 103 may be a more complex one (e.g. comprising more than one pin or contact) too, e.g., such as an SPI terminal, CAN terminal or FlexRay terminal.

According to further embodiments of the present invention a device may be configured to provide the error signal 103 and the recovery signal 105 at one common terminal (e.g. an SPI terminal), for example, using one and the same communication protocol for the error signal 103 and the recovery signal 105.

According to a further embodiment of the present invention the device 200 may be configured to detect a plurality of different error conditions in the device 200 and may be configured to generate for each error condition of the plurality of different error conditions an own error signal 103 indicating this error condition. Furthermore, the device 200 may be configured to generate for each possible error condition of the plurality of different error conditions an own recovery signal 105 indicating a mitigation or the possibility of mitigation of this error condition in the device 200.

According to further embodiments of the present invention, said device 200 may be configured to output a qualified error recovery signal such that the device 200 has two sets of information that notifies that the error condition or the fault condition is vanished or mitigated: the recovery signal 105 and the error signal 103. As an example, after recovery (or after mitigation of the error condition) the error signal 103 can be released or reset under hardware control if the intended (recovery) events took place and the recovery signal 105 can be seen as an additional confirmation from the software. In other words, the error signal 103 together with the recovery signal 105 may be designated as a qualified recovery signal, wherein the external device 200 may be configured to reset the error signal 103 after a mitigation of the error condition, indicating that no error condition is apparent anymore in the external device 200 and to additionally provide the confirmation that the error condition is mitigated by means of the recovery signal 105.

An error signal handling unit (e.g. the error signal handling unit 100 or 150) may be configured to omit outputting the error condition signal 107 only if it receives within the given delay time from the reception of the error signal 103 this qualified recovery signal (which is based on a reset of the error signal 103 and on the confirmation of the mitigation of the error condition by means of the additional recovery signal 105).

In contrast to this and according to further embodiments, as already described, the device 200 may be configured to provide the error signal 103 and the recovery signal 105 such that the recovery signal is formed by a reset of the error signal 103. In this case the device 200 may be configured to provide the error signal 103 and the recovery signal 105 at one and the same terminal.

Figure 3A:
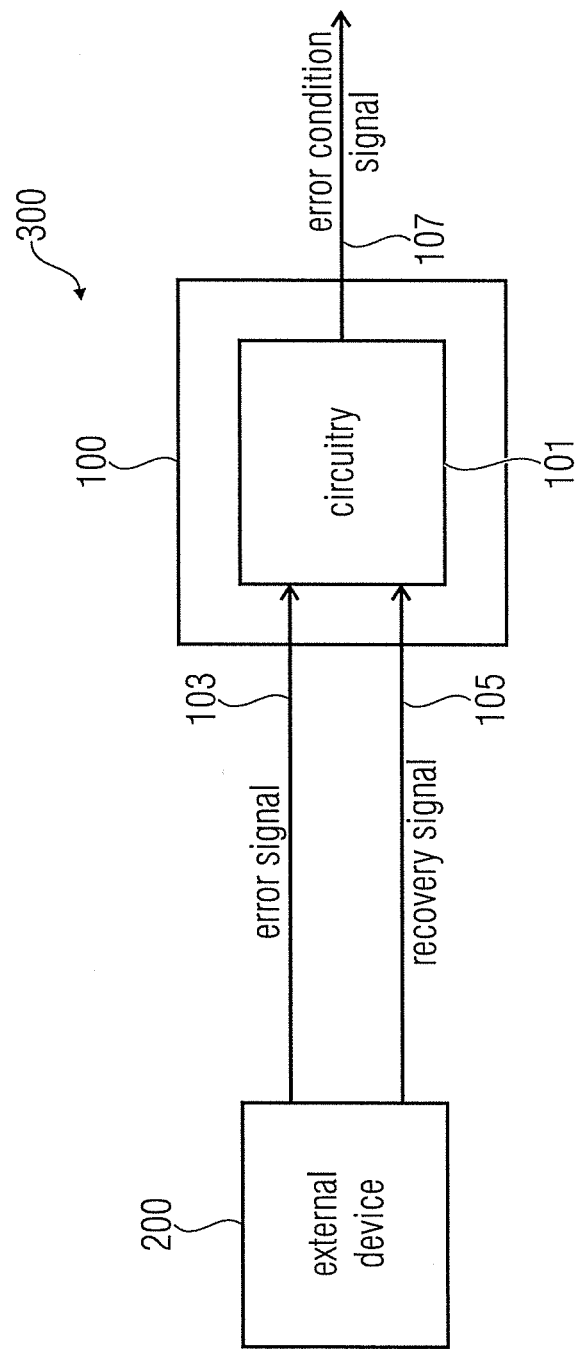
FIG. 3a shows a block schematic diagram of an error signal handling system according to an embodiment of the present invention.

FIG. 3a shows a block schematic diagram of an error signal handling system 300 according to a further embodiment of the present invention.

The error signal handling system 300 comprises the external device 200 shown in FIG. 2 and the error signal handling unit 100 shown in FIG. 1a. Hence, the explanations provided for the error signal handling unit 100 and the external device 200 also apply to the error signal handling system 300.

As can be seen, the (external) device 200 is connected to the error signal handling unit 100.

In other words the error signal handling unit 100 is configured to receive the error signal 103 and the recovery signal 105 from the external device 200 and to output, based on a reception of the error signal 103 from the external device 200 the error condition signal 107 if it does not receive within the given delay time from the reception of the error signal 103 the recovery signal 105 from the external device 200.

To summarize, FIG. 3a shows the error handling system 300 comprising the device 200 configured to output in response to an error condition in the device 200 the error signal 103 indicating the error condition and output in response to a mitigation of the error condition or if a mitigation of the error condition is possible the recovery signal 105 indicating the mitigation or the possibility of mitigation of the error condition. Furthermore, the error signal handling system 300 comprises the error signal handling unit 100 comprising the circuitry 101 configured to receive the error signal 103 and the recovery signal 105 from the device 200. The circuitry 101 is configured to output the error condition signal 107 based on the error signal 103 in response to a reception of the error signal 103 if within the given delay time from the reception of the error signal 103, the circuitry 101 does not receive the recovery signal 105 and otherwise to omit outputting the error condition signal 107.

The device 200 may be external to the error handling system 100.

As an example, the device 200 may comprise a first substrate (or may be arranged on a first substrate) which is placed apart from a second substrate of the error signal handling unit 100 (e.g., in which the error signal handling unit 100 is arranged).

The device 200 may be connected to the error signal handling unit 100, for example, by means of one or more wires for transmitting the error signal 103 and/or the recovery signal 105.

Figure 3B:
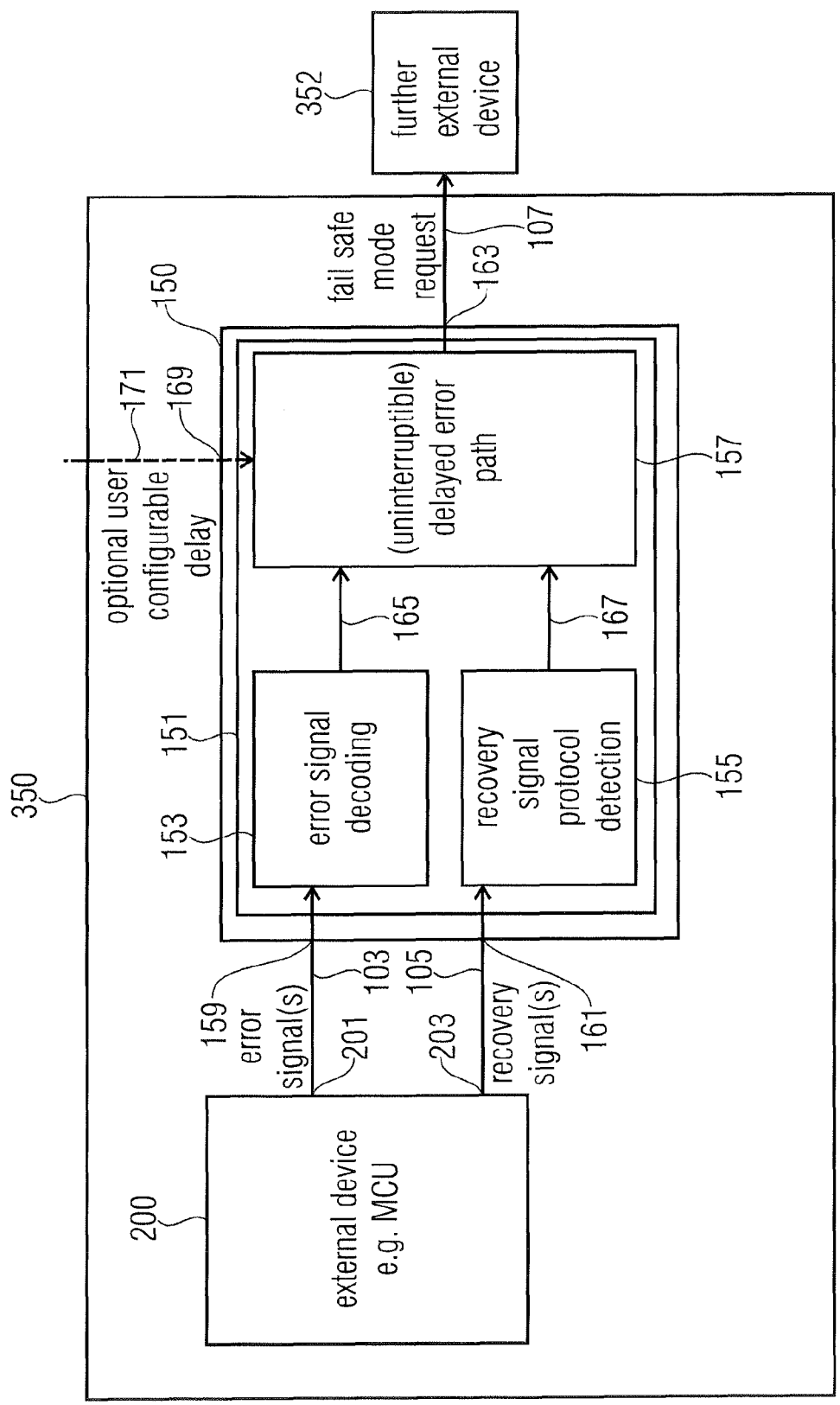
FIG. 3b shows a block schematic diagram of an error signal handling system according to a further embodiment of the present invention.

FIG. 3b shows a block schematic diagram of an error signal handling system 350 according to a further embodiment of the present invention.

The error signal handling system 350 differs from the error signal handling system 300 shown in FIG. 3a in that the error signal handling system 350 comprises the error signal handling unit 150 shown in FIG. 1b instead of the error signal handling unit 100. Furthermore, FIG. 3b shows a block schematic diagram of a further external device 352 which may be external to the error signal handling system 350 and, especially, may be no part or component of the error signal handling system 350. The device 200 (which may be external to the error signal handling unit 150) is coupled to the error signal handling unit 150, e.g., the first terminal 201 of the device 200 can be coupled to the first terminal 159 for transferring error signals 103 from the first terminal 201 of the device 200 to the first terminal 159 of the error signal handling unit 150. Furthermore, the second terminal 203 of the device 200 may be connected to the second terminal 161 of the error signal handling unit 150 for transferring the recovery signal 105 from the second terminal 203 of the device 200 to the second terminal 161 of the error signal handling unit 150. The error signal handling system 350 may be configured to provide as an output signal the error condition signal 107 or failsafe mode request signal 107, for example, to the further external device 352. If the further external device 352 receives this error condition signal 107 or failsafe mode request signal 107, the further external device 352 (which may be an ECU) may enter a failsafe mode.

As already mentioned, this entering of the failsafe mode can be prevented with the error signal handling system 350, if the error condition in the device 200 is already mitigated or can be mitigated by delaying a forwarding of the error signal 103 and by omitting an outputting of the failsafe mode request signal 107, if within the given delay time the recovery signal 105 is received.

Figure 4:
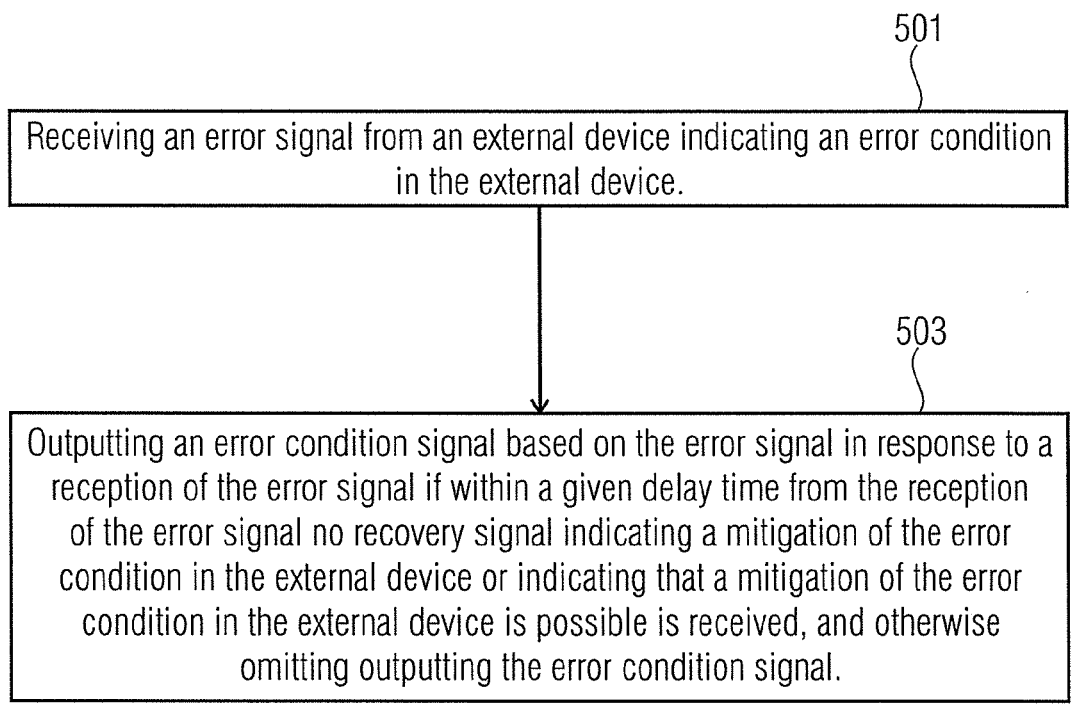
FIG. 4 shows a flow diagram of a method according to an embodiment of the present invention.

FIG. 4 shows a flow diagram of a method 500 for outputting an error condition signal according to an embodiment of the present invention.

The method 500 comprises a step 501 of receiving an error signal from an external device indicating an error condition in the external device.

Furthermore, the method 500 comprises a step 503 of outputting an error condition signal based on the error signal in response to reception of the error signal if within a given delay time from the reception of the error signal no recovery signal indicating a mitigation of the error condition in the external device or indicating that a mitigation of the error condition in the external device is possible is received and otherwise omitting outputting the error condition signal.

Some aspects of embodiments of the present invention will be summarized in the following.

Embodiments of the present invention provide a new approach for safely managing errors in order to improve a system availability. Further embodiments of the present invention allow an ECU to safely avoid to enter in failsafe for critical errors along this error is mitigated in the allowed (given) delay time.

Typically automotive ECUs are built in a way that a critical error always leads to an entering of the failsafe mode, such that an error recovery is possible only after this. Hence, it is still an issue that the ECU service but was stopped. But what was acceptable in the past is no longer acceptable now, for example, electronic steering now reaching heavy vehicles where an ECU failsafe may raise concerns about vehicle controllability.

Hence, embodiments of the present invention solves this issue by providing a mechanism/method to safely prevent to enter into failsafe mode as soon as an error is detected.

As can be seen from FIGS. 3a and 3b such an error signal handling mechanism can be based on two paths: the error path (e.g., one or two signals) used to report that an error has been detected by an external component (e.g., by the external device 200, for example an MCU) and the recovery path used to disable the failsafe mode entry.

Some embodiments of the present invention have the following features:

A circuitry (e.g., the circuitry 101 or 151) which is implemented to detect that a new error condition has been posted by an external circuitry (e.g., by the external device 200).

A user configurable delay unit (e.g., the error condition signal generation stage 157) which is configured to delay this error condition (or the error signal 103) so that it cannot force entering in failsafe as long as the (given) delay time has not expired.

An error recovery path (e.g., inside the error condition signal generation stage 157) which is configured to block the error propagation in the delay unit as long as the recovery is done by the end of the user defined (given) delay time, or in other words, as long as the error condition in the external device 200 is mitigated before the end of the given delay time.

Embodiments of the present invention may be designed to support repetitive errors from the external circuitry as already described.

In an implementation example of embodiments of the present invention (e.g., shown in FIG. 3b) the error signal 103 may be comprised out of one or two signals, wherein an error is reported during a known time. Recovery signals 105 may use a robust protocol, for example a SPI protocol with a specific command. The circuitry 151 may be implemented in an external device to the MCU (e.g., to the device 200).

Embodiments of the present invention delay a critical error signal in order to allow a transaction using different signals (the recovery signals 105) to postpone an error mode entry. This is different to known embedded systems in which critical errors always lead to entering into failsafe. Hence, the delaying of a critical error is a paradigm which is broken by embodiments of the present invention.

According to some embodiments (e.g., according to the embodiment shown in 3b) a protocol between two devices (e.g., between the device 200 and the error signal handling unit 150) may be defined so that the one (the device 200) posting a critical error (e.g., in the form of the error signal 103) then has the option to disable it using a robust command (e.g., the recovery signal 105) to the other device (to the error signal handling unit 150).

The method 500 may be supplemented by any of the features and functionalities described herein with respect to the apparatus, and may be implemented using the hardware components of the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

The invention claimed is:

1. Error signal handling unit comprising:
a circuitry configured to receive an error signal from an external device indicating an error condition in the external device;
wherein the circuitry is further configured to receive a recovery signal indicating a mitigation of the error condition in the external device or indicating that a mitigation of the error condition in the external device is possible; and
wherein the circuitry is further configured to output an error condition signal based on the error signal in response to a reception of the error signal if within a given delay time from the reception of the error signal, the circuitry does not receive the recovery signal and otherwise to omit outputting the error condition signal.

2. Error signal handling unit to claim 1,
wherein the circuitry is further configured to forward the error signal if within the given delay time the circuitry does not receive the recovery signal.

3. Error signal handling unit according to claim 1,
wherein the circuitry is further configured to decode the error signal and to generate the error condition signal based on the decoded error signal.

4. Error signal handling unit according to claim 1,
wherein the circuitry is further configured to decode the recovery signal according to a given communication protocol decoding rule.

5. Error signal handling unit according to claim 4,
wherein the circuitry is further configured to decode the error signal according to a further communication protocol decoding rule which is different to the communication protocol decoding rule.

6. Error signal handling unit according to claim 1,
wherein the circuitry comprises:
a first input terminal for connecting the external device and for receiving the error signal; and
a second input terminal for connecting the external device and for receiving the recovery signal.

7. Error signal handling unit according to claim 1,
wherein the circuitry is further configured to generate a fail safe mode request signal based on the error signal indicating a request to a further external device to enter a fail safe mode and to output the fail safe mode request signal as the error condition signal.

8. Error signal handling unit according to claim 1,
wherein the circuitry is further configured such that the given delay time is configurable by a user.

9. Error signal handling unit according to claim 1,
wherein the given delay time comprises a fixed part which is not adjustable and an adjustable part which is adjustable by a user.

10. Error signal handling unit according to claim 1,
wherein the circuitry is further configured to receive a further error signal indicating a further error condition in the external device and to receive a further recovery signal indicating a mitigation of the further error condition or indicating that a mitigation of the further error condition in the external device is possible; and
wherein the circuitry is further configured to output a further error condition signal based on the further error signal in response to a reception of the further error signal
if within a further given delay time from the reception of the further error signal, the circuitry does not receive the further recovery signal.

11. Error signal handling unit according to claim 10,
wherein the further given delay time is different from the given delay time.

12. Error signal handling unit according to claim 10,
wherein the circuitry is configured to generate the error condition signal and the further error condition signal such that the error condition signal is equal to the further error condition signal.

13. Error signal handling unit according to claim 1,
wherein the circuitry comprises:
an error signal decoding stage to decode the error signal and to generate a decoded error signal;
a recovery signal protocol detection stage configured to decode the recovery signal according to a given communication protocol decoding rule and to generate a decoded recovery signal;
an error condition signal generation stage configured to generate the error condition signal based on the decoded error signal and to output the error condition signal if within the given delay time, the error condition signal generation stage does not receive the decoded recovery signal and otherwise to omit outputting the error condition signal.

14. Device configured to output in response to an error condition in the device an error signal indicating the error condition and to output in response to a mitigation of the error condition or if a mitigation of the error condition is possible a recovery signal indicating the mitigation or the possibility of mitigation of the error condition.

15. Device according to claim 14,
further configured to output the error signal according to a first communication protocol and the recovery signal according to a second communication protocol, wherein the first communication protocol and the second communication protocol are different.

16. Error signal handling system comprising:
a device configured to output in response to an error condition in the device an error signal indicating the error condition and to output in response to a mitigation of the error condition or if a mitigation of the error condition is possible a recovery signal indicating the mitigation or the possibility of mitigation of the error condition; and
an error signal handling unit comprising a circuitry configured to receive the error signal and the recovery signal from the device; and
wherein the circuitry is further configured to output an error condition signal based on the error signal in response to a reception of the error signal if within a given delay time from the reception of the error signal, the circuitry does not receive the recovery signal and otherwise to omit outputting the error condition signal.

17. Error signal handling system according to claim 16,
wherein the device comprises a first substrate which is spaced apart from a second substrate of the error signal handling unit.

18. Error signal handling unit comprising:
a first input terminal;

a second input terminal;

an output terminal; and an error signal delay stage coupled between the first input terminal, the second input terminal and the output terminal; and wherein the error signal delay stage is configured to provide, in response to a reception of an error signal from an external device at the first input terminal indicating an error condition in the external device, an error condition signal based on the error signal at the output terminal if within a given delay time, the error signal delay stage does not receive a recovery signal from the external device at the second input terminal indicating a mitigation of the error condition in the external device or indicating that a mitigation of the error condition in the external device is possible and otherwise to omit outputting the error condition signal.

19. Means for outputting an error condition signal, wherein the means is configured to receive an error signal from an external device indicating an error condition in the external device; and wherein the means is further configured to receive a recovery signal indicating a mitigation of the error condition in the external device or indicating that a mitigation of the error condition in the external device is possible; and wherein the means is further configured to output an error condition signal based on the error signal in response to a reception of the error signal if within a given delay time from the reception of the error signal, the means does not receive the recovery signal and otherwise to omit outputting the error condition signal.

20. Error signal handling unit comprising:

an error signal decoding stage configured to receive an error signal from an external device indicating an error condition in the external device, to decode the error signal and to generate a decoded error signal;

a recovery signal protocol detection stage configured to receive a recovery signal indicating a mitigation of the error condition in the external device or indicating that a mitigation of the error condition in the external device is possible, to decode the recovery signal according to a given communication protocol decoding rule and to generate a decoded recovery signal; and an error condition signal generation stage configured to generate a fail safe mode request signal based on the decoded error signal, the fail safe mode request signal indicating a request to a further external device to enter a fail safe mode, and to output the fail safe mode request signal as an error condition signal if within a given delay time from a reception of the decoded error signal, the error condition signal generation stage does not receive the decoded recovery signal and otherwise to omit outputting the fail safe mode request signal.

21. Method for outputting an error condition signal, the method comprising:

receiving an error signal from an external device indicating an error condition in the external device; and outputting an error condition signal based on the error signal in response to a reception of the error signal if within a given delay time from the reception of the error signal no recovery signal indicating a mitigation of the error condition in the external device or indicating that a mitigation of the error condition in the external device is possible is received, and otherwise omitting outputting the error condition signal.

22. Non transitory storage medium having stored thereon a computer program having a program code for performing, when running on a computer, a method for outputting an error condition signal, the method comprising:

receiving an error signal from an external device indicating an error condition in the external device; and outputting an error condition signal based on the error signal in response to a reception of the error signal if within a given delay time from the reception of the error signal no recovery signal indicating a mitigation of the error condition in the external device or indicating that a mitigation of the error condition in the external device is possible is received and otherwise omitting outputting the error condition signal.

* * * * *